(12) United States Patent
Chou (10) Patent No.: US 6,665,179 B2
(45) Date of Patent: Dec. 16, 2003

(54) BLADE SERVER MODULE (75) Inventor: Chin-Wen Chou, Hsin-Tien (TW)

(73) Assignee: Shin Jiuh Corp., Hsin-Tien (TW)

( * ) Notice: Subject to any disclaimer, the term of this patent is extended or adjusted under 35 U.S.C. 154(b) by 85 days.

(21) Appl. No.: 10/066,770

(22) Filed: Feb. 6, 2002

(65) Prior Publication Data
US 2003/0147219 A1 Aug. 7, 2003

(51) Int. Cl.[7] .................................................. G06F 1/20
(52) U.S. Cl. ...................... 361/687; 361/686; 361/695; 361/725; 312/223.2; 454/184
(58) Field of Search .............................. 361/683, 686, 361/687, 684, 724–729, 732, 754, 788, 796, 695; 312/223.11, 223.2, 265.2, 334.31, 236; 174/35 R, 356 C, 52.1, 66, 67; 415/213.1, 214.1; 165/121–126; 454/184

(56) References Cited

U.S. PATENT DOCUMENTS 6,288,897 B1 * 9/2001 Fritschle et al. ............ 361/687
6,324,062 B1 * 11/2001 Treiber et al. .............. 361/727
6,392,872 B1 * 5/2002 Doustou et al. ............ 361/681
6,496,366 B1 * 12/2002 Coglitore et al. ........... 361/687
6,574,100 B1 * 6/2003 Anderson ................... 361/687

FOREIGN PATENT DOCUMENTS

JP        02002366258 A  * 12/2002  ............. G06F/1/20

* cited by examiner

Primary Examiner—Michael Datskovsky
(74) Attorney, Agent, or Firm—Birch, Stewart, Kolasch & Birch, LLP (57) ABSTRACT A blade server module for simultaneously installing a plurality layers of small servers in a front and rear array fashion to form a supercomputer for processing a large amount of data mainly includes a casing which have holding units divided to form retrieval spaces for housing the small servers, a radiator located in the casing and an outer lid located on the upper side of the casing. The server module may house and couple a plurality of small servers to form a supercomputer for processing a large amount of data.

10 Claims, 9 Drawing Sheets

BLADE SERVER MODULE

FIELD OF THE INVENTION

The present invention relates to a blade server module and particularly a server module for coupling a plurality of small servers to process large amount of data.

BACKGROUND OF THE INVENTION

The rapid innovations and developments of technology have created even more data that require more powerful computers to process. The computers with the processor built on a single chip cannot meet the requirements of processing those huge amount of data. Some producers have assembled supercomputers for this purpose.

For instance, in the area of biotechnology, the needs for supercomputers to process huge amount of data are especially keen and urgent. Some producers have developed and introduced supercomputers by assembling a plurality of 1U servers. In these types of supercomputers, each 1U server includes at least a power supply device, a motherboard, a hard disk drive, a radiation air fan and an optical disk drive. As the 1U server has to contain these hardware facilities, it requires a relatively large casing. As a result, the size and weight of 1U server become bigger and heavier. And assembling supercomputers also becomes time-consuming and takes a lot of processes. Assembling, repairs and maintenance and transportation also are difficult, and result in higher costs. Moreover, when in operation, the hardware that are actually being used are power supply device, motherboard and hard disk drive. The radiation air fan and optical disk drive are generally not operative, and thus becomes a waste.

SUMMARY OF THE INVENTION

The primary object of the invention is to resolve the foregoing disadvantages. The invention provides a small sever that includes only a power supply device, a motherboard and a hard disk drive so that the server becomes small size and light weight. Then a plurality of the small servers are coupled and housed in a server module in a front and rear array manner to share one set of radiator so that the whole module becomes more economic effective.

Another object of the invention is to allow air fans of the radiator be monitored and maintained individually, and to allow assembly done with less time and processes at a lower cost.

The foregoing, as well as additional objects, features and advantages of the invention will be more readily apparent from the following detailed description, which proceeds with reference to the accompanying drawings.

DESCRIPTION OF THE PREFERRED EMBODIMENT

Referring to FIGS. 1 through 4 for assembling of the small server, inner and outer lids, and air fans and radiator of the invention, the blade server module of the invention includes a casing 1, at least one radiator 2 located in the casing 1, at least one inner lid 3 located in the casing 1, an outer lid 4 located on an upper side of the casing 1, and at least one small server 5 located in the casing 1. A plurality of the small servers 5 (including a power supply device 52, a motherboard 53, and a hard disk drive 54) are coupled to form a supercomputer to process large amount of data.

Figure 1:
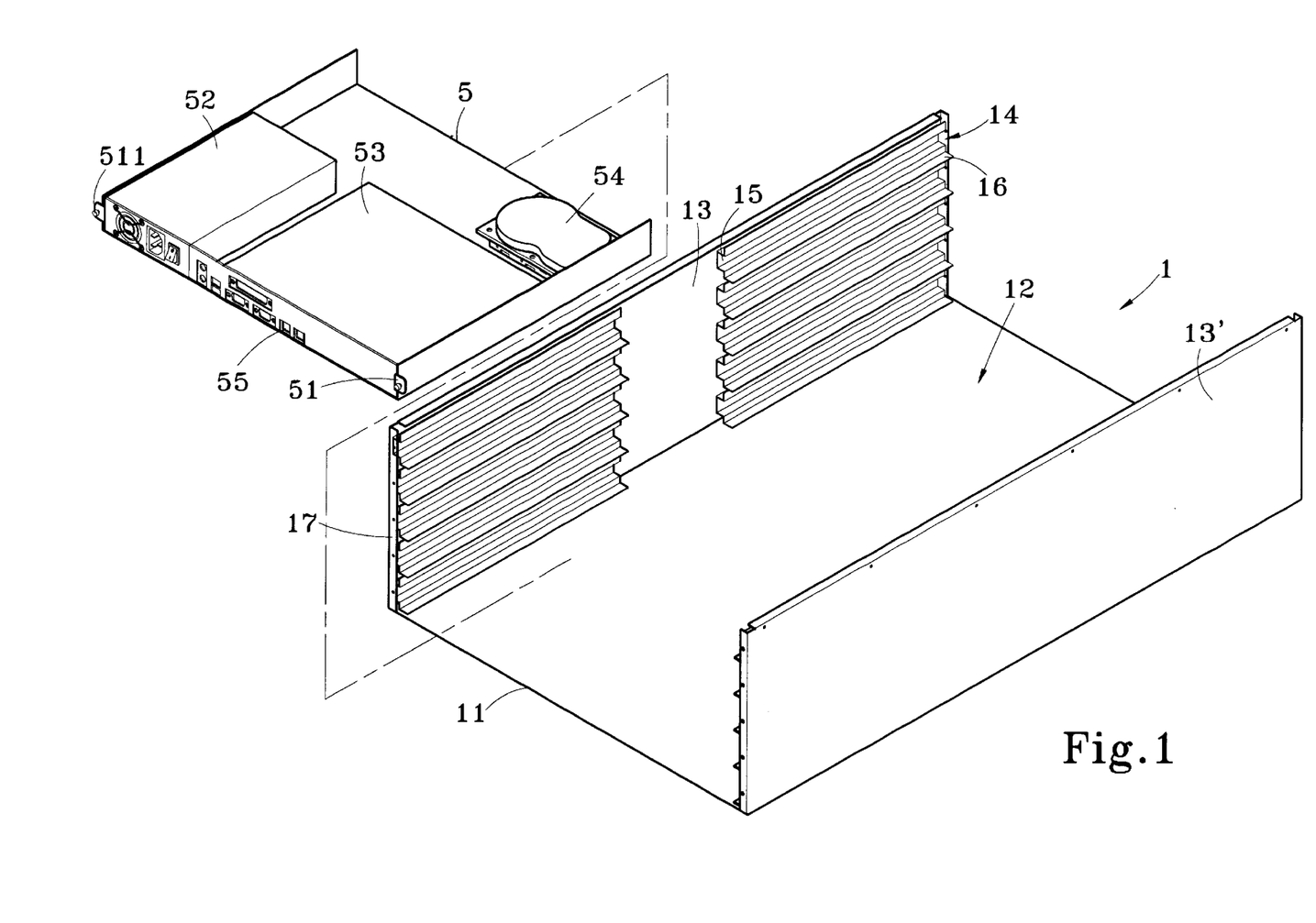
FIG. 1 is a schematic view of a small server and a casing of the invention to be assembled.

The casing 1 includes a base plate 11 for forming a housing chamber 12 and two side walls 13, 13' connecting to two sides of the base plate 11. The side walls 13, 13' have respectively a plurality of holding units 14 located on a front and a rear section of thereof corresponding to each other to form divided spaces for holding the small servers 5 therein, and allowing the small servers 5 retrievable therefrom. The holding units 14 are formed by a bending a sheet continuously and include a first anchor section 15 fastened to the side walls 13, 13', and a loading section 16 serving as a slide rail to facilitate retrieval of each small server 5 for maintenance and assembly. The front end on two sides of the casing 1 has at least one fastening section 17 corresponding to each holding unit 14 for locking the small server 5.

Figure 2:
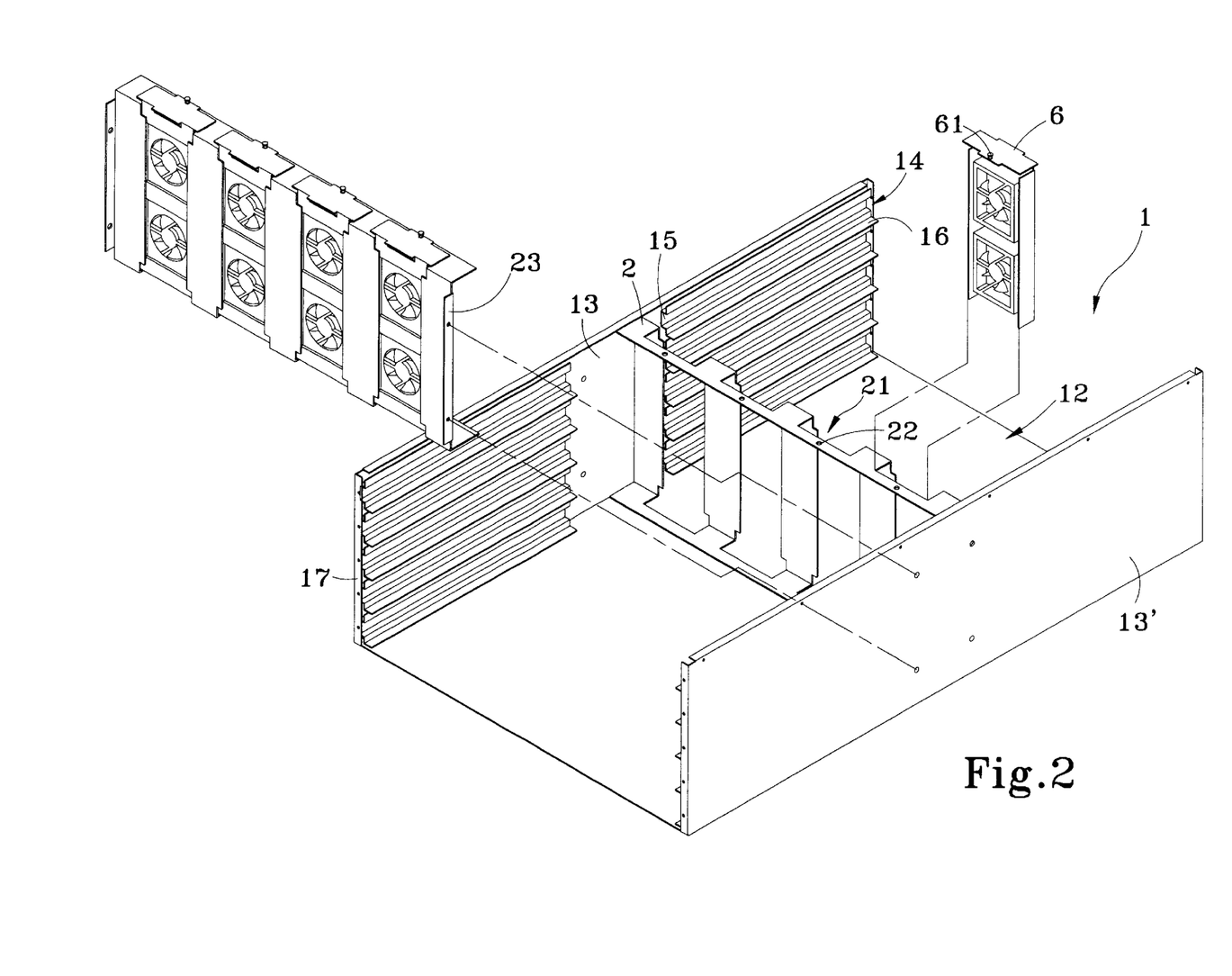
FIG. 2 is a schematic view of air fans and a radiator of the invention to be assembled.

The radiator 2 is located in the casing 1 and interposed between the front and rear holding units 14, and consists of two symmetrical brackets which has at least one coupling section 21 for receiving an air fan 6. The coupling section 21 has one side with a coupling trough 22 formed thereon. After the air fan 3 is inserted into the coupling section 21, a fastening member 61 may be fastened to the upper side of the air fan 6 over the coupling trough 22. The brackets of the radiator 2 has two sides formed a second anchor section 23 for fastening to the casing 1.

Figure 3:
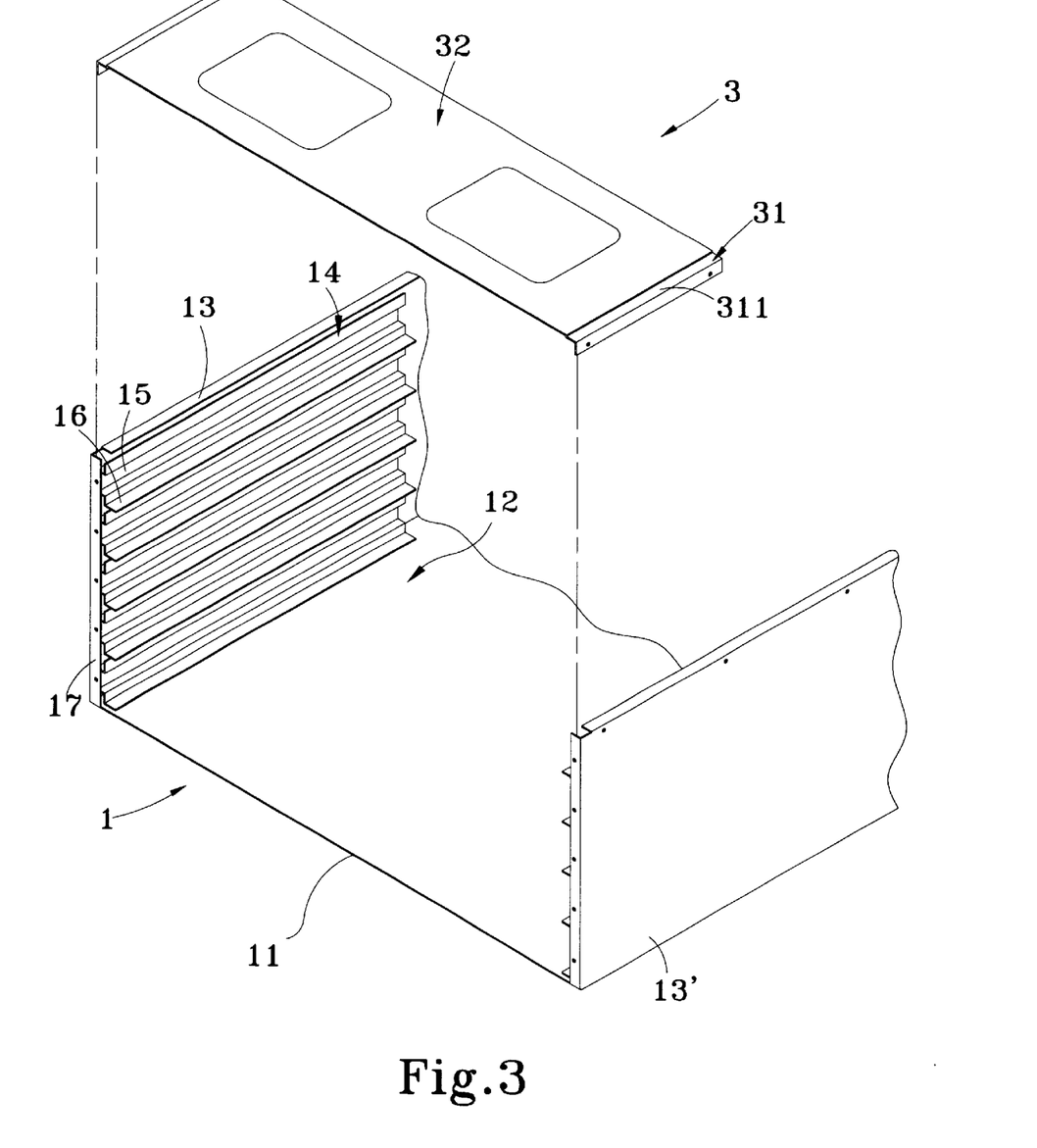
FIG. 3 is a schematic view of an inner lid and a casing of the invention to be assembled.

The inner lid 3 is located on an inner side of the upper section of the casing 1 at the front and rear section thereof, and has a reinforced plate 31 and a bottom plate 32. The reinforced plate 31 has two sides formed respectively a third anchor section 311 to allow the reinforced section 31 fastening to an upper and inner side of the casing 1 to allow the casing 1 withstanding external stress.

Figure 4:
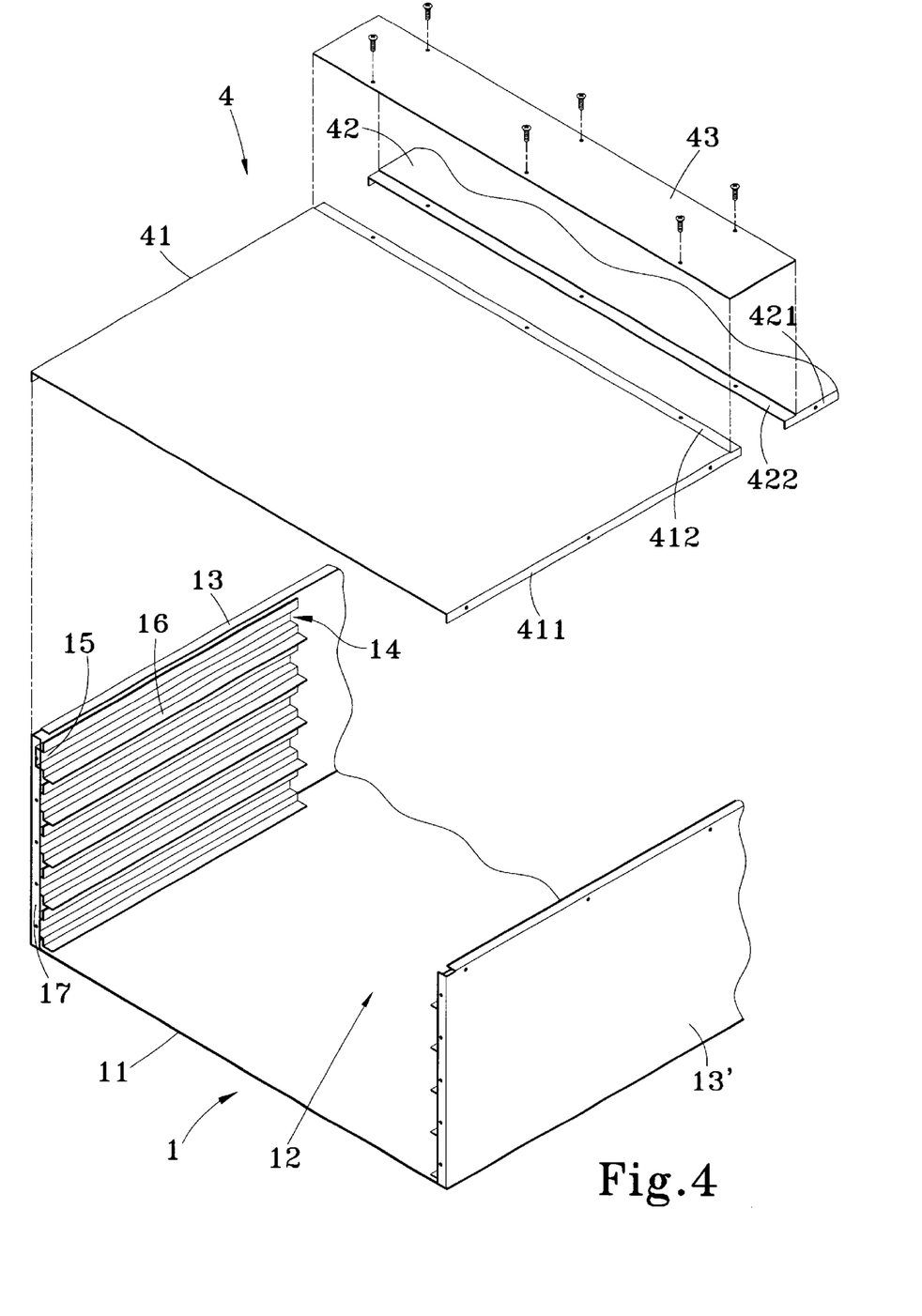
FIG. 4 is a schematic view of an outer lid and a casing of the invention to be assembled.

The outer lid 4 is located on an upper side of the casing 1 and includes a front lid 41, a rear lid 42, and a middle lid 43. The front and rear lids 41, 42 have respectively two sides formed a fourth and a fifth anchor sections 411, 421 for fastening to the exterior of the casing 1. The front and rear lids 41, 42 further have respectively one end formed a second and third coupling sections 412, 422 which have a lower elevation than the surface of the front and rear lids 41, 42 for fastening to the middle lid 43 so that the middle lid 43 is at the same surface level of the front and rear lids 41, 42 when fastened.

The small server 5 is wedged in one of the holding units 14 and has a jutting section 51 to fasten to the fastening section 17 of the casing 1. By means of aforesaid construction, a blade server module for housing a plurality of small servers 5 is formed.

Figure 5:
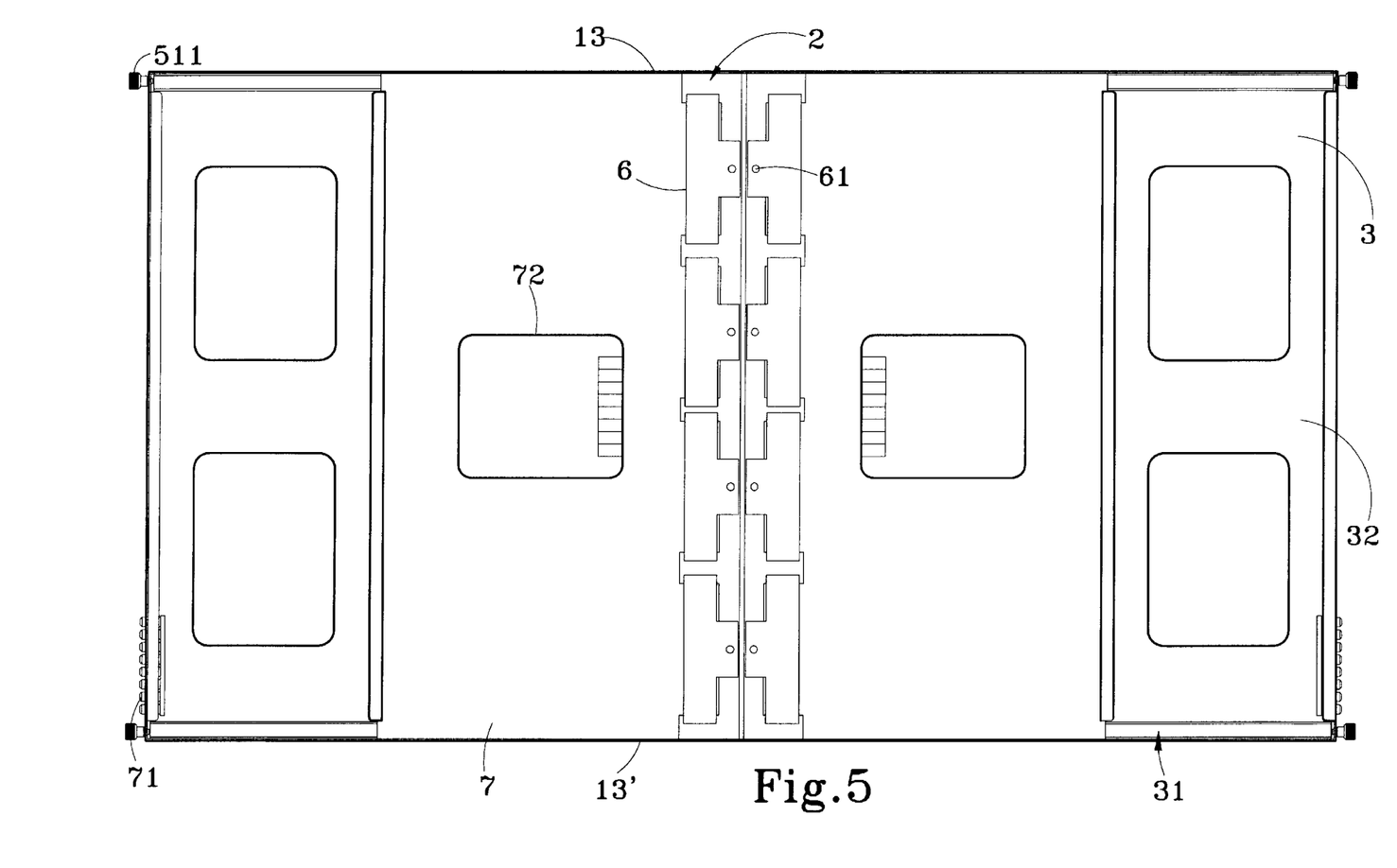
FIG. 5 is a schematic top view of the invention.
Figure 6:
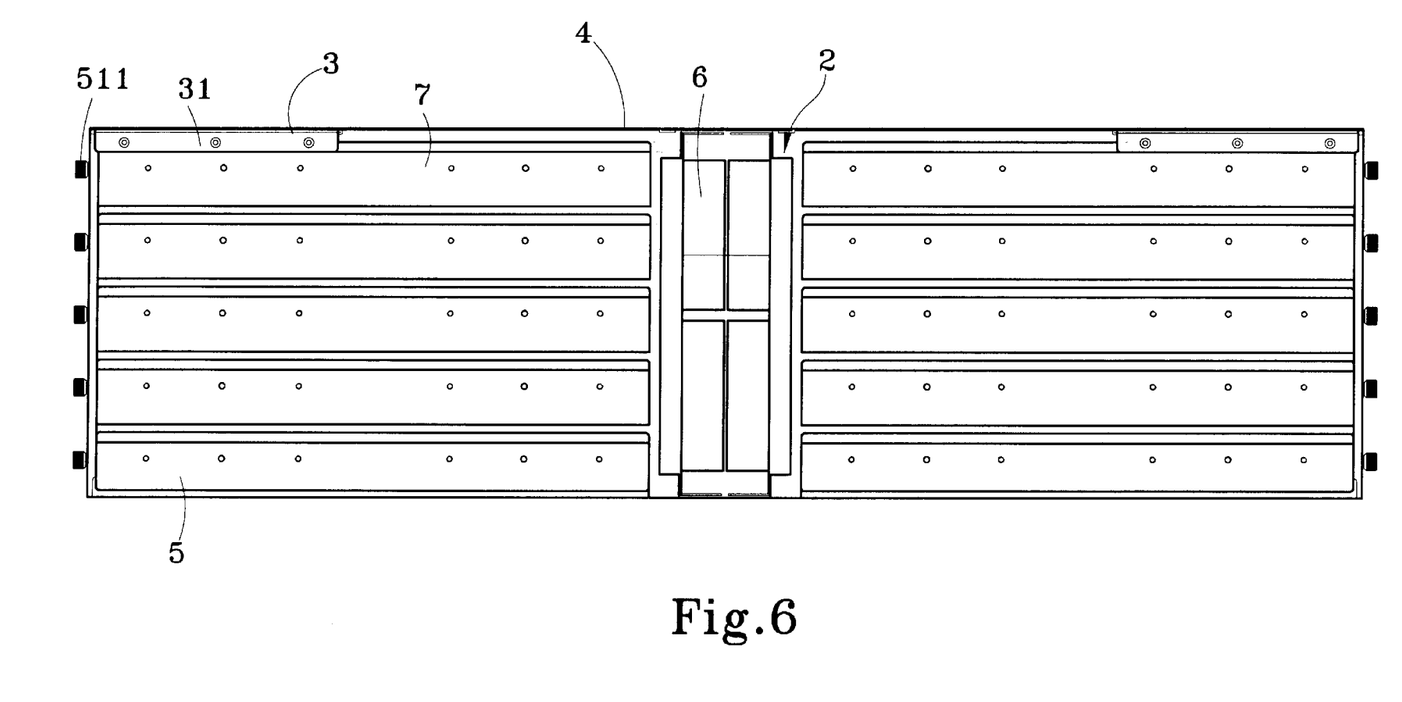
FIG. 6 is a schematic side view of the invention.

Referring to FIGS. 5 and 6, to assemble the invention, first, insert the small server 5 along the holding unit 14 into the casing 1 from the front end of the casing 1, fasten the jutting section 51 of the small server 5 to the fastening section 17 of the casing 1 through a fastening element for holding the small server 5 securely in the casing 1.

After the small server 5 is assembled as set forth above, insert the air fan 6 of the radiator 2 into the coupling section 21, and fasten the fasten member 61 of the air fan 6 on the coupling trough 22 to hold the air fan 6 securely in the radiator 2 between the front and rear servers 5.

When the servers 5 are operative, generated heat is dispersed by the air fan 6 to allow the servers 5 operating normally.

Figure 7:
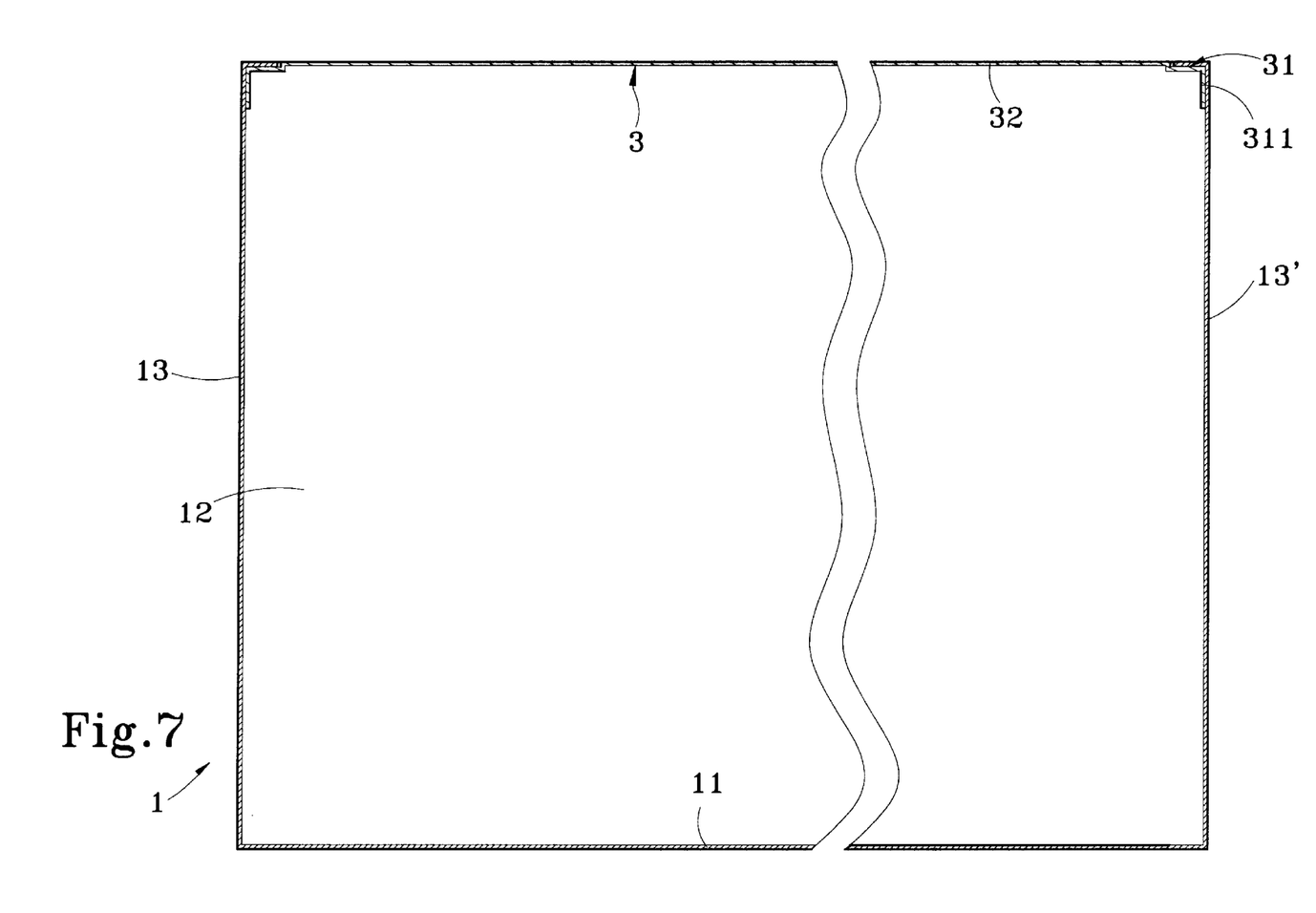
FIG. 7 is a schematic view of an inner lid assembled on a casing according to the invention.

Referring to FIG. 7, after the air fan 6 is installed in the casing 1, the inner lid 3 may be installed inside the casing 1 at an upper section thereof with the reinforced plate 31 and the bottom plate 32 fastening to the inner side and upper side of the casing 1 so that the casing 1 can withstand external stress to prevent the casing from deformation and damaging the hardware housed in the casing 1.

Figure 8:
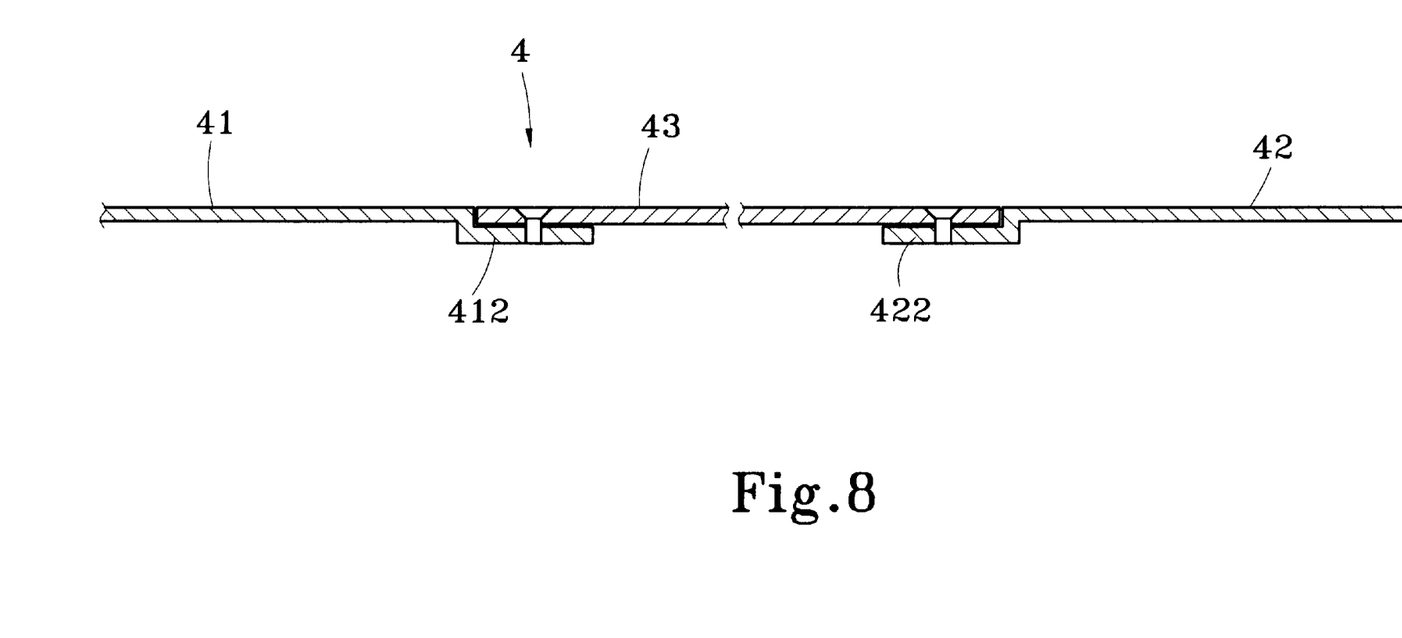
FIG. 8 is a schematic view of a coupled outer lid according to the invention.

Referring to FIG. 8, after the inner lid 3 is installed, fasten the front lid 41 and rear lid 42 to the front section and rear section of the casing 1, and fasten the middle section 43 to the third and fourth coupling section 412, 422 of the front and rear lids 41, 42. Hence in the event of the air fan 6 located in the casing 1 is malfunctioned, the malfunctioned air fan 6 may be removed for repairing by unfastening the middle lid 43. Thus maintenance of the air fan 6 is much easier.

Figure 9:
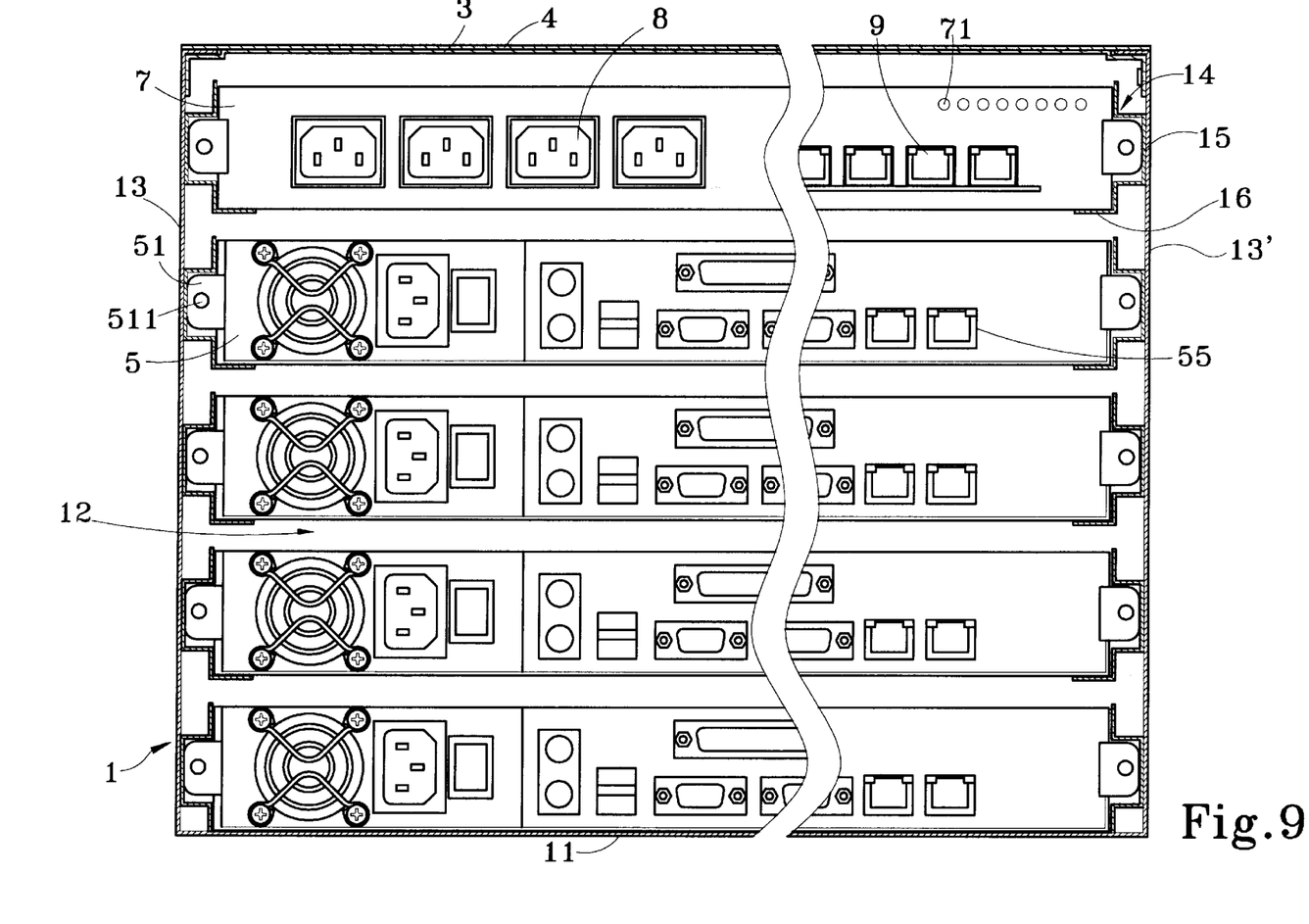
FIG. 9 is a schematic view of another embodiment of the invention.

Referring to FIG. 9 for another embodiment of the invention, after the small servers 5 and air fans 6 are installed in the casing 1, a switch control server 7 may be mounted to the top layer of the small servers 5. The switch control server 7 may include, but not limited to, a power supply socket 8, an air fan control card 72 and a network control cluster socket 9. As shown in FIG. 5, the switch control server 7 has a front face panel on which the network control cluster socket 9 is mounted, and the network control cluster socket 9 may be coupled in series with network control sockets 55 located on the front end of various small servers 5 to form a desired server module. Moreover, the switch control server 7 has the air fan control card 72 located therein. The air fan control card 72 may extend an indication light 71 on the front face panel of the switch control server 7 to indicate operation conditions of the air fans 6. Such a construction of coupling the design of the outer lid 4 shown in FIG. 8 allow repairs and maintenance of the air fans 6 be proceeded immediately whenever needed to keep internal temperature at a desired condition for normal operations.

What is claimed is:

1. A blade server module for coupling a plurality of small servers to form a server module to process a large amount of data, comprising:

a casing including a base plate for forming a housing chamber, and two side walls connecting to two sides of the base plate and having respectively a plurality of holding units located on a front and a rear section of the side walls corresponding to each other to form divided spaces for holding the small servers therein, and allowing the small servers retrievable therefrom;

a radiator located in the casing and interposed between the holding units on the front and the rear sections having at least one coupling section for receiving an air fan; and an outer lid located on an upper side of the casing.

2. The blade server of claim 1, wherein the holding units are formed by ending a sheet continuously and include a first anchor section fastened to the side walls and a loading section.

3. The blade server of claim 1, wherein the casing has at least one fastening section located at a front end on two sides thereof corresponding to each holding unit, and each small server having a jutting section for fastening to the fastening section through a fastening element.

4. The blade server of claim 1, wherein the coupling section of the radiator has a coupling trough for fastening to a fastening member located on the air fan.

5. The blade server of claim 1, wherein the outer lid includes a front lid, a rear lid and a middle lid.

6. The blade server of claim 5, wherein the front lid and the rear lid have respectively one end formed a second and a third coupling section which have a lower elevation than the surfaces of the front and the rear lids for fastening to the middle lid so that the middle lid is at the same surface level of the front and the rear lids when fastened.

7. The blade server of claim 1 further having an inner lid installed on an inner side at an upper section of the casing.

8. The blade server of claim 7, wherein the inner lid has a reinforced plate and a bottom plate, the reinforced plate having two sides formed a third anchor section.

9. The blade server of claim 1, wherein each small server includes at least a power supply device, a motherboard and a hard disk drive, and has a front end formed a network control socket for linking hardware in series to form the server module.

10. The blade server of claim 1, wherein the small servers on the top layer of the casing has installations of a power supply socket, an air fan control card and a network control cluster socket to form a switch control server.

* * * * *